US006101730A

United States Patent [19]

Marino

[11] Patent Number: 6,101,730

[45] Date of Patent: Aug. 15, 2000

[54] TEMPLATE JIG FOR DETERMINING PRECISE CUTTING LINES ON TILES

[76] Inventor: Vincent A Marino, 745 C Ramona Ave., Staten Island, N.Y. 10309

[21] Appl. No.: 09/096,661

[22] Filed: Jun. 12, 1998

[51] Int. Cl.[7] ........ G01B 5/24

[52] U.S. Cl. ........ 33/526; 33/527; 33/456; 33/562

[58] Field of Search ........ 33/452, 456, 464, 33/465, 472, 526, 527, 562, 809, 473, 419, 427, 482

[56] References Cited

U.S. PATENT DOCUMENTS

| | | | |
|---|---|---|---|
| 2,770,043 | 11/1956 | Kwiechinski | 33/452 |
| 4,827,625 | 5/1989 | Le Moal | 33/527 |
| 5,357,683 | 10/1994 | Trevino | 33/528 |
| 5,361,508 | 11/1994 | Ruggiero | 33/527 |
| 5,398,423 | 3/1995 | Smith | 33/526 |
| 5,410,816 | 5/1995 | Ruggiero | 33/527 |
| 5,447,004 | 9/1995 | Vrnak | 52/387 |
| 5,480,081 | 1/1996 | Wilson et al. | 225/96.5 |
| 5,505,359 | 4/1996 | Joecker, Jr. | 225/96.5 |
| 5,617,642 | 4/1997 | Marios | 33/526 |
| 5,732,474 | 3/1998 | Cannon | 33/452 |

FOREIGN PATENT DOCUMENTS

| | | | |
|---|---|---|---|
| 454626 | 10/1991 | European Pat. Off. | 33/562 |
| 899178 | 5/1945 | France | 33/456 |
| 935158 | 10/1955 | Germany | 33/464 |

*Primary Examiner*—Andrew H. Hirshfeld
*Assistant Examiner*—R. Alexander Smith
*Attorney, Agent, or Firm*—Michael I Kroll

[57] ABSTRACT

A marking indicator template jig for marking a tile to be cut and positioned in an open area of a size smaller than a size of the tile. The jig includes first and second legs pivotally connected together. A first telescoping leg is pivotally connected to a second end of the first leg and a second telescoping leg is pivotally connected to a second end of the second leg. The first and second telescoping legs each have an adjustable length. The marking indicator template jig is movable between a first unextended position and a second extended and in use position wherein the first and second legs are positioned within an open area smaller than the tile and against adjacent tiles defining a first portion of the open area and the length of the first and second telescoping legs are adjusted to meet an obstruction defining a second portion of the open area such that the marking indicator template jig is of a dimension substantially equal to that of the open area for use in marking the tile for cutting. The first and second legs may be adjustable in their length for use with tiles having a wide range of sizes. The first and second telescoping legs are pivotally and removably connected to the second end of their respective leg and may be connected together for use in measuring an open area having a size less than half the size of a tile.

2 Claims, 11 Drawing Sheets

TEMPLATE JIG FOR DETERMINING PRECISE CUTTING LINES ON TILES

BACKGROUND OF THE INVENTION

1. Field of the Invention

The present invention relates generally to marking and cutting tile squares and, more specifically, to a template jig able to precisely mark a line on a tile indicating an amount of a tile which should be cut to provide an accurate fit within the area it is desired to be positioned.

2. Description of the Prior Art

Numerous types of devices for indicating at which point and along which line a tile should be cut have been provided in the prior art. For example, U.S. Pat. No. 5,398,423; 5,410,816; 5,447,004; 5,480,081 and 5,505,359 all are illustrative of such prior art. While these units may be suitable for the particular purpose to which they address, they would not be as suitable for the purposes of the present invention as heretofore described.

U.S. Pat. No. 5,398,423

Inventor: Allen L. Smith

Issued: Mar. 21,1995

Straight edge apparatus for setting a level, second row of tile in the e tub splash above an upper side edge of a tub, and extendible straight edge apparatus are disclosed. The apparatus for setting the second row of tile comprises an elongated straight edge forced by a substantially flat, elongated member having at least one straight edge and a width that is less than the side dimension of the tile being laid. A flat flange extending substantially perpendicular from a straight edge of the flat, elongated member, and at least two, spaced apart leg means of adjustable length extend from the flat, elongated member in a direction away from the float flange on the flat, elongated member. Tile flat elongated member can be set flatwise against a wall on which the tile of the tub splash is to be set, with distal ends of the leg means resting on the upper side edge of the tub and being adjusted in length so that the flat flange is level.

A second embodiment of straight edge is disclosed that comprises two nested angle members that can slide in telescopic movement. Channel clips are used to secure the nested angle members as a single unit. The effective length of the straight edge call be adjusted by extending the nested angle members and thereby vary the effective length of the straight edge.

U.S. Pat. No. 5,410,816

Inventor: Joseph Ruggiero

Issued: May 2, 1995

A body, having a straight edged rule fixed thereto, and transverse thereto, slidably receives a pair of blocks which also have straight edged rules fixed thereto. All the rules are parallel, and one thereof is used to engage a proximate wall surface, while the other two are adjustably set to take the measure across a last laid tile. Then, the first, which engages the wall surface is fully retracted, while the adjustably set other two rules are advanced, with the body, to the wall surface. The outermost rule, then, along its straight edge, defines whereat a next tile is to be cut to fit an undersized space.

U.S. Pat. No. 5,447,004

Inventor: Miroslav Vrnak

Issued: September 5, 1995

A tile setting grid which is nailed or otherwise permanently attached to a floor or wall upon which tiles are to be installed. The tile setting grid is suppliable in sheet or roll format and has openings disposed therein within which tiles are laid. A plurality of alignment fingers which engage some edges of tiles disposed therein provide an alignment reference. The tile setting grid is also manufactured having a height representing a fraction of tile thickness thereby enabling the user to cover the entire grid with cementitious grout thereby providing a finished tiled surface.

U.S. Pat. No. 5,480,081

Inventor: Wilson et al.

Issued: Jan. 2, 1996

A tile cutting apparatus includes a unit base for holding a tile and guide rods above and running parallel to the base. The guide rods carry a scoring/breaking assembly along a scoring and breaking path. The base includes, on its upper surface, a breaker spline inserted therein and extending along the scoring path. The base's upper surface also includes resilient pads supporting stainless steel rest plates on both sides of the breaker spline. The spline is oriented at a slight angle with respect to the surface of the rest plates to facilitate breaking. The scoring/breaking assembly includes a spring for applying constant pressure to a cutting wheel throughout the scoring operation. The scoring/breaking assembly is constructed such that a single handle allows the user to engage and disengage the cutting wheel, score the tile while maintaining a constant scoring pressure and break the tile. The apparatus includes a molded cover and base that minimize excess assembly and parts.

U.S. Pat. No. 5,505,359

Inventor: Eduard Joecker, Jr

Issued: Apr. 9, 1996

A tile cutter including an elongated bottom plate having a transversely extending tile stop backing and a longitudinal breaking web disposed on the bottom plate. A slide is movably mounted along a horizontal guide above the breaking web, with the slide angle lever being pivotally mounted on the slide and including a cutting wheel, breaker head and an actuating arm. The bottom plate is divided into a front and rear bearing area which, together with the tile breaker web, form a reliable three point support even for small tile strips by a lateral transverse recess having a width which is sufficient for enabling gripping of a tile to be cut peripherally on the edge side.

SUMMARY OF THE PRESENT INVENTION

The present invention relates generally to marking and cutting tile squares and, more specifically, to a template jig able to precisely mark a line on a tile indicating an amount of a tile which should be cut to provide an accurate fit within an undersized area the tile is desired to be positioned.

A primary object of the present invention is to provide a marking indicator template jig that will overcome the shortcomings of prior art devices.

Another object of the present invention is to provide a marking indicator template jig which is able to indicate a line or plurality of lines for cutting a tile to be laid in a pattern.

A further object of the present invention is to provide a marking indicator template jig which is able to find the line or lines of any obstacles to laying the tile in the desired pattern.

A yet further object of the present invention is to provide a marking indicator template jig able to mark a tile for cutting to fit in an undersized area.

A still further object of the present invention is to provide a marking indicator template jig including a pair of telescoping legs able to extend and retract to match the size of any tile.

An even further object of the present invention is to provide a marking indicator template jig wherein the pair of telescoping legs are detachable from the stationary legs for marking a tile for placement in an area less than half the size of the tile.

Another object of the present invention is to provide a marking indicator template jig that is simple and easy to use.

A still further object of the present invention is to provide a marking indicator template jig that is economical in cost to manufacture.

Additional objects of the present invention will appear as the description proceeds.

A marking indicator template jig for marking a tile to be cut and positioned in an open area of a size smaller than a size of the tile is described by the present invention. The jig includes first and second legs pivotally connected together. A first telescoping leg is pivotally connected to a second end of the first leg and a second telescoping leg is pivotally connected to a second end of the second leg. The first and second telescoping legs each have an adjustable length. The marking indicator template jig is movable between a first unextended position and a second extended and in use position wherein the first and second legs are positioned within an open area smaller than the tile and against adjacent tiles defining a first portion of the open area and the length of the first and second telescoping legs arc adjusted to meet an obstruction defining a second portion of the open area such that the marking indicator template jig is of a dimension substantially equal to that of the open area for use in marking the tile for cutting. The first and second legs may be adjustable in their length for use with tiles having a wide range of sizes. The first and second telescoping legs are pivotally and removably connected to the second end of their respective leg and may be connected together for use in measuring an open area having a size less than half the size of a tile.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
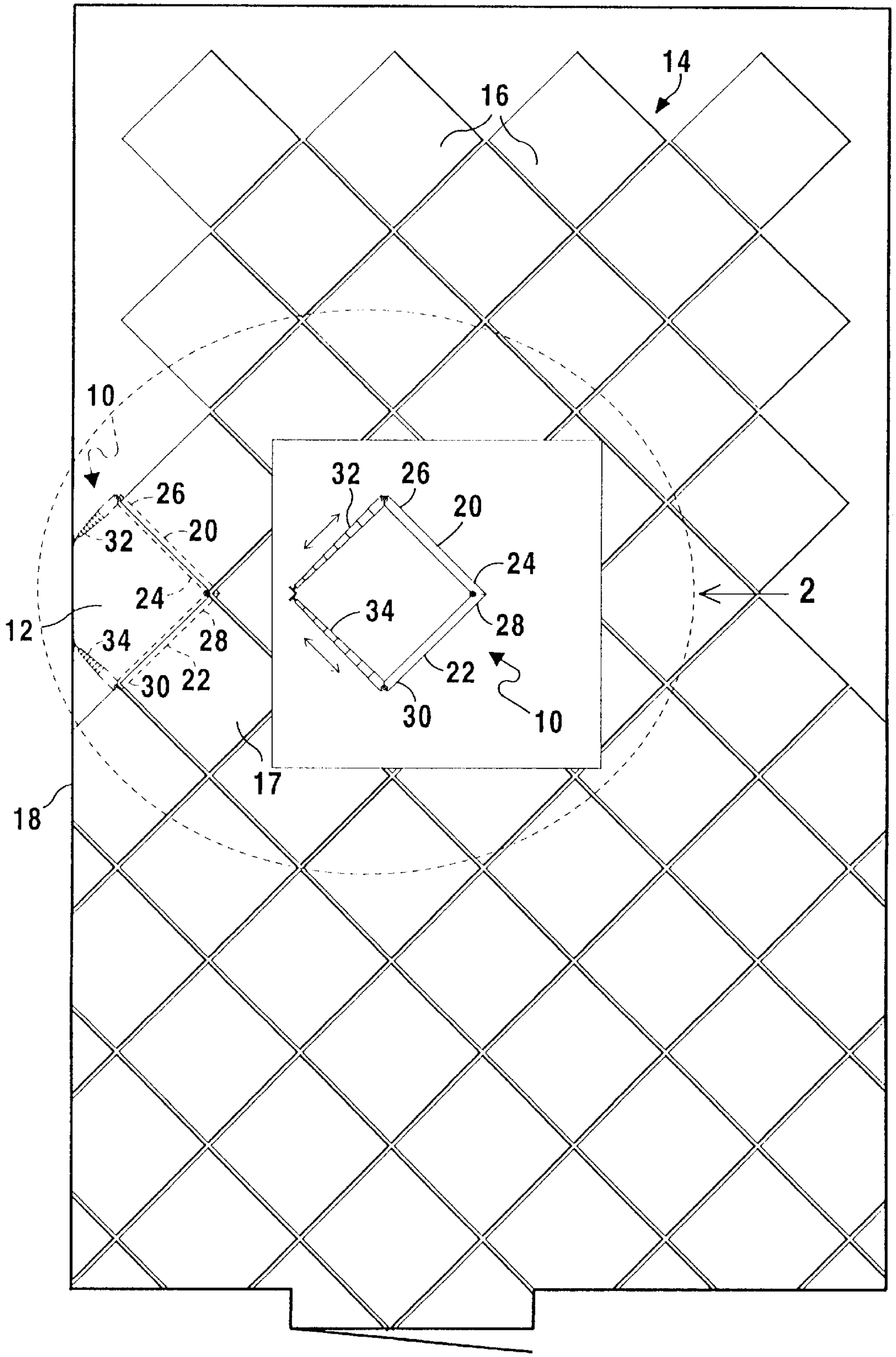
FIG. 1 is a top plan view of a floor in which tiles are being laid in a diagonal pattern using the marking indicator template jig of the present invention for marking the tiles which need to be cut.

Turning now descriptively to the drawings, in which similar reference characters denote similar elements throughout the several views, the Figures illustrate the marking indicator template jig of the present invention. With regard to the reference numerals used, the following numbering is used throughout the various drawing figures.

10 tile cutting marking indicator template jig of the present invention
12 open space
14 floor
16 diagonal pattern of tiles
17 tile positioned adjacent the open area
18 side wall
20 first leg of tile cutting marking indicator template jig
22 second leg of tile cutting marking indicator template jig
24 first end of first leg
26 second end of first leg

28 first end of second leg
30 second end of second leg
32 first telescoping leg
34 second telescoping leg
36 plurality of sections forming first and second telescoping legs
38 arrow indicating movement of first telescoping leg
40 arrow indicating movement of second telescoping leg
42 first foot
44 extension portion of first foot
46 flat portion of first foot
48 last one of plurality of sections forming first telescoping leg
50 arrow indicating movement of extension section of first foot
51 arrow indicating pivotal movement of flat section of first foot
52 second foot
54 extension portion of second foot
56 flat portion of second foot
58 last one of plurality of sections forming second telescoping leg
60 arrow indicating movement of extension section of second foot
62 arrow indicating pivotal movement of flat section of second foot
64 line between flat portions of feet indicating point at which tile is to be cut
66 base of each flat portion
68 pivotal connection between first and second telescoping legs
70 head of open area
72 line between flat portions of feet indicating point at which tile is to be cut
74 grout gap adjustment cams
76 first adjustable leg
78 second adjustable leg
80 base side of first adjustable leg
82 dovetail recess in first adjustable leg
84 base side of second adjustable leg
86 dovetail recess in second adjustable leg
88 connection device
90 first arm of connection device
92 second arm of connection device
94 pivotal connection
96 dovetail protrusion extending from first arm
98 dovetail protrusion extending from second arm

DETAILED DESCRIPTION OF THE PREFERRED EMBODIMENT

Turning now descriptively to the drawings, in which similar reference characters denote similar elements throughout the several views, FIGS. 1 through 9 illustrate the marking indicator template jig for cutting a tile of the present invention indicated generally by the numeral 10.

The marking indicator template jig for cutting a tile 10 is shown in FIG. 1 positioned within an open area 12 of a floor 14. A diagonal pattern of tiles 16 is being positioned on the floor 14. The open area 12 is an undersized area limited and partially defined by an obstruction illustrated herein as a side wall 18. Tiles 17 positioned adjacent the open area 12 define the remaining sides of the undersized open area 12. As the shape of the undersized open area 12 is different from an area able to accommodate a full size tile 16, the tile to be positioned in the area 12 must be reduced in size to fit the size of the area 12.

Prior to reducing the size of the tile to match the dimensions of the undersized area 12, the undersized area 12 must be measured and the tile must be marked to indicate where the cutting should be performed. The marking indicator template jig 10 is used to measure the dimensions of the undersized area 12 and mark the tile 16, indicating the areas which must be cut. The marking indicator template jig 10 is formed of first and second legs 20 and 22, respectively. The first leg 20 has first and second ends 24 and 26, respectively, and the second leg 22 also has first and second ends 28 and 30, respectively. The first end 24 of the first leg 20 is pivotally connected to the first end 28 of the second leg 22. The pivotal connection between the first and second legs 20 and 22, respectively, preferably prevents the angle therebetween from being greater than substantially 90°. Thus when the marking indicator template jig 10 is in a fully extended position, the first and second legs extend perpendicular to each other and will match the two sides of the open area defined by the adjacent tiles 17. Extending from and pivotally connected to the second end 26 of the first leg 20 is a first telescoping leg 32 and extending from and pivotally connected to the second end 30 of the second leg 22 is a second telescoping leg 34.

When the marking indicator template jig 10 is aligned to match the outer dimensions of the undersized open area 12 the first and second legs 20 and 22 are pivoted to extend substantially perpendicular to each other. The first telescoping leg 32 is positioned to extend substantially perpendicular to the first leg 20 and substantially parallel to the second leg 22 while the second telescoping leg 32 is positioned to extend substantially perpendicular to the second leg 22 and substantially parallel to the first leg 20. In this alignment, the first and second telescoping legs 32 and 34 are positioned to extend towards each other. This will form a square as shown in the inset box of FIG. 1. The first and second telescoping legs 32 and 34 are then length adjusted to meet the size of the open area 12. The marking indicator template jig 10 is positioned within the open area 12 such that the first and second legs 20 and 22 contact the sides of adjacent tiles 17 defining two sides of the open area 12. The telescoping legs 32 and 34 are then adjusted further to be of a length able to contact the obstruction further defining the dimensions of the undersized area 12, in this case the side wall 18. The marking indicator template jig 10 is now identical in its dimensions to that of the open area 12.

When the marking indicator template jig 10 is removed from the open area 12 it can be matched with a tile and used to draw a line on the tile. The line drawn on the tile indicates where the tile must be cut to match the dimensions of the open area 12 for cutting and ultimate placement within and filling the open area 12.

Figure 2:
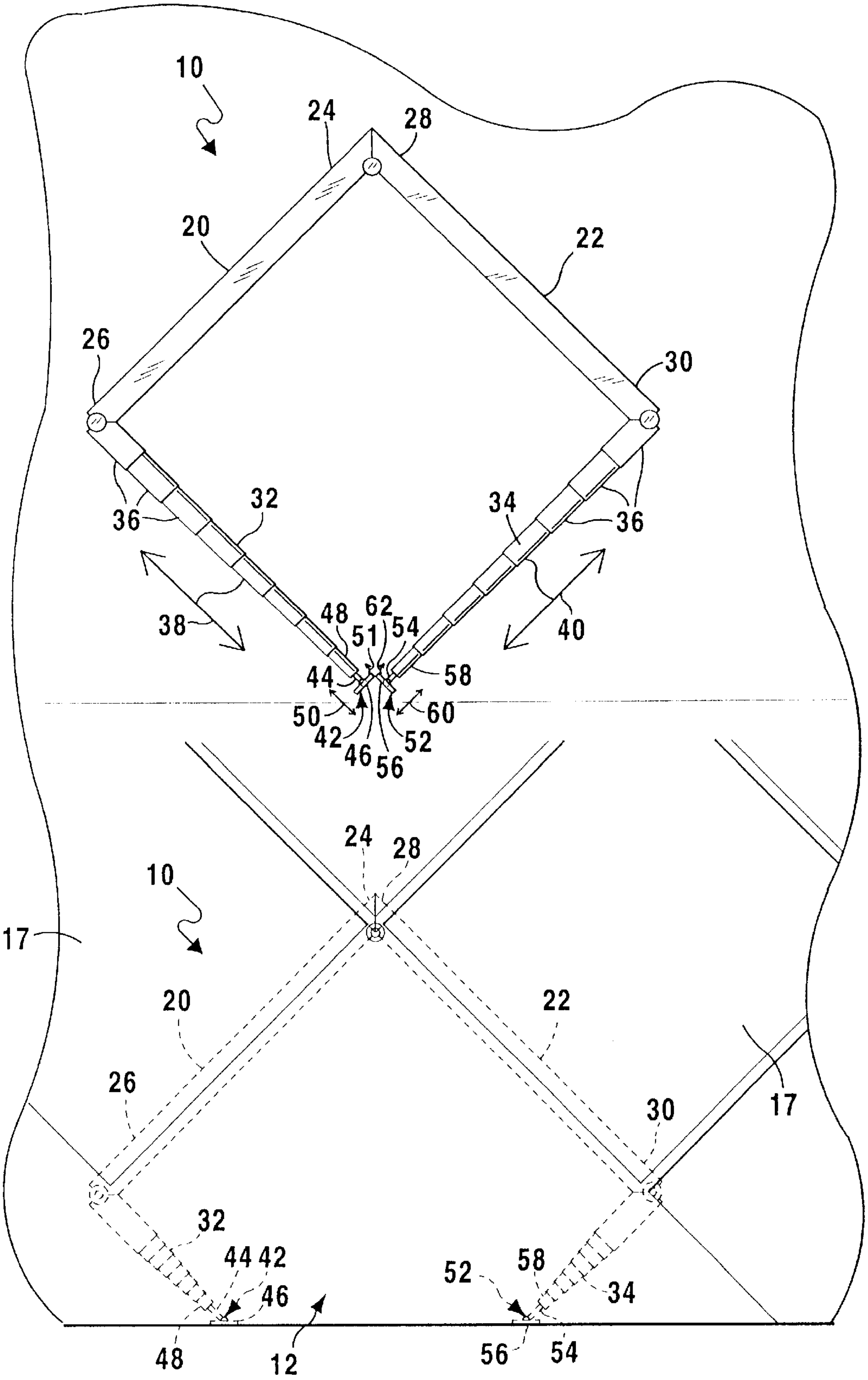
FIG. 2 is a top plan exploded view of the marking indicator template jig of the present invention taken within the circle labeled 2 in FIG. 1.

FIG. 2 is an enlarged view of the marking indicator template jig 10 and the open area 12 being measured thereby. As can be seen from this figure the first and second telescoping legs 32 and 34, respectively, are each formed from a plurality of interconnected sections 36. Each of the sections 36 are of a differing diameter whereby the diameter of each section 36 decreases as the distance of the section 36 from the connection with the second end of its respective leg 20 or 22 increases. Each section 36 is able to slide within an adjacently located section 36 having a larger diameter thus allowing the first and second telescoping legs 32 and 34, respectively, to vary their length. The adjustable nature of the length of the first telescoping leg 32 is indicated by the arrow labeled 38 and the adjustable nature of the length of the second telescoping leg 34 is indicated by the arrow labeled 40.

Pivotally connected to an end of the first telescoping leg 32 opposite the connection to the first leg 20 is a foot 42. The foot 42 includes an extension portion 44 and a flat portion 46 pivotally connected thereto. The foot 42 is slidably connected to a last one 48 of the plurality of sections 36 whereby the distance at which the extension portion 44 extends from the last one 48 of the plurality of sections 36 is variable as is indicated by the arrow labeled 50. The flat portion 46 of the foot 42 is pivotally connected to the extension portion 44 as indicated by the arrow labeled 51 and thereby able to meet the obstruction in a flush manner as shown in dashed lines in FIG. 2.

Pivotally connected to an end of the second telescoping leg 34 opposite the connection to the second leg 22 is a foot 52. The foot 52 includes an extension portion 54 and a flat portion 56 pivotally connected thereto. The foot 52 is slidably connected to a last one 58 of the plurality of sections 36 whereby the distance at which the extension portion 54 extends from the last one 58 of the plurality of sections 36 is variable as is indicated by the arrow labeled 60. The flat portion 56 of the foot 52 is pivotally connected to the extension portion 54 as indicated by the arrow labeled 62 and thereby able to meet the obstruction flushly as shown in dashed lines in FIG. 2.

Figure 3:
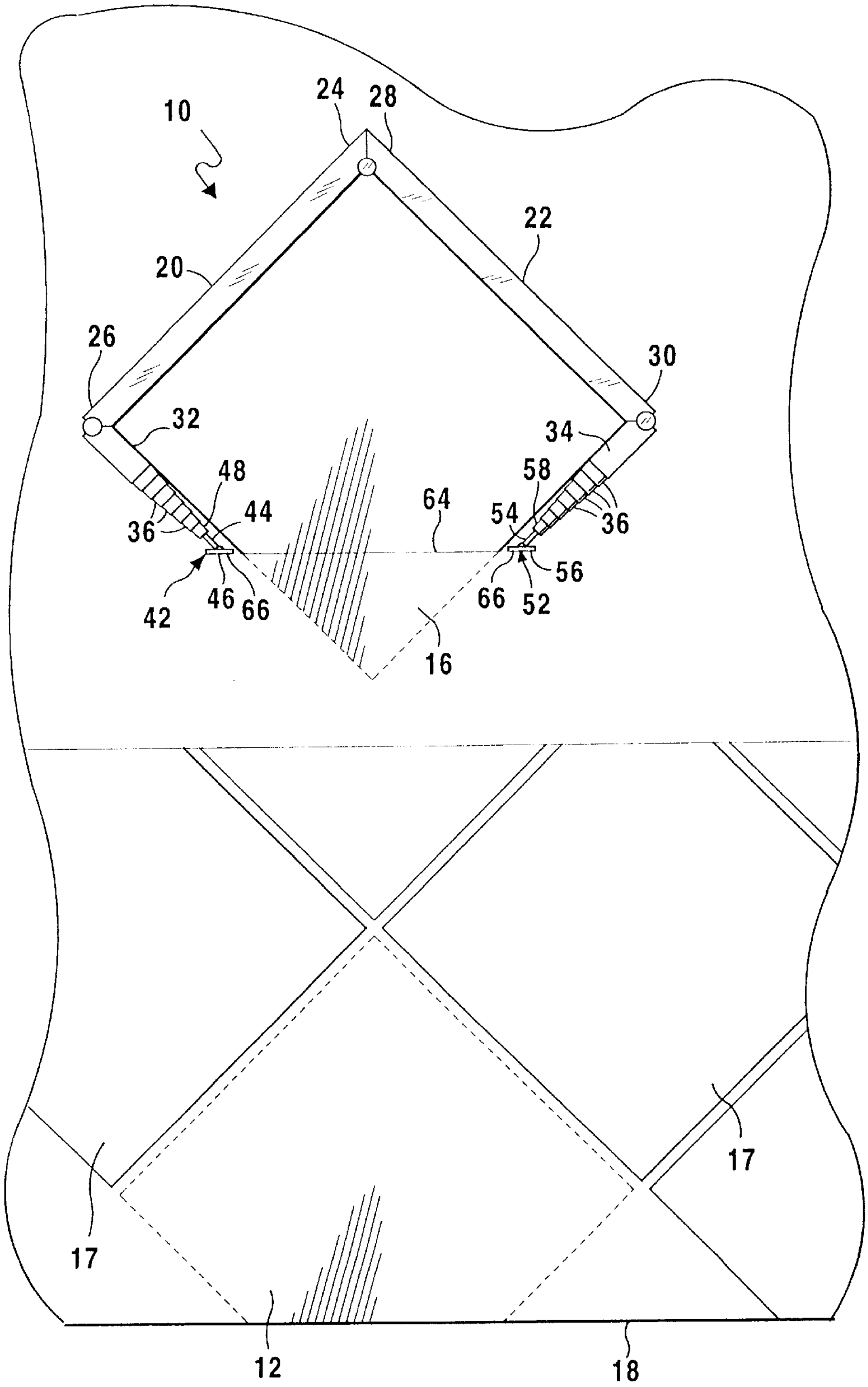
FIG. 3 is a top plan view of the marking indicator template jig of the present invention including telescoping legs adjusted for marking and cutting a tile to the desired shape.

FIG. 3 illustrates the marking indicator template jig 10 in an adjusted position whereby the length of the first and second telescoping legs 32 and 34, respectively, have been adjusted to match the dimensions of the open area 12 indicated by the dashed lines. In this figure, the marking indicator template jig 10 is positioned over a full size tile 16. A line 64 is drawn between the flat portions 46 and 56 of the first and second feet 42 and 52 to indicate where the tile 16 must be cut to match the dimensions of the open area 12. When the flat portions 46 and 56 of the first and second feet 42 and 52 are positioned flush with the obstruction, a base 66 of each flat portion lies in the same plane. The line 64 is drawn along the plane formed therebetween to indicate the point at which the tile 16 is to be cut.

Figure 4:
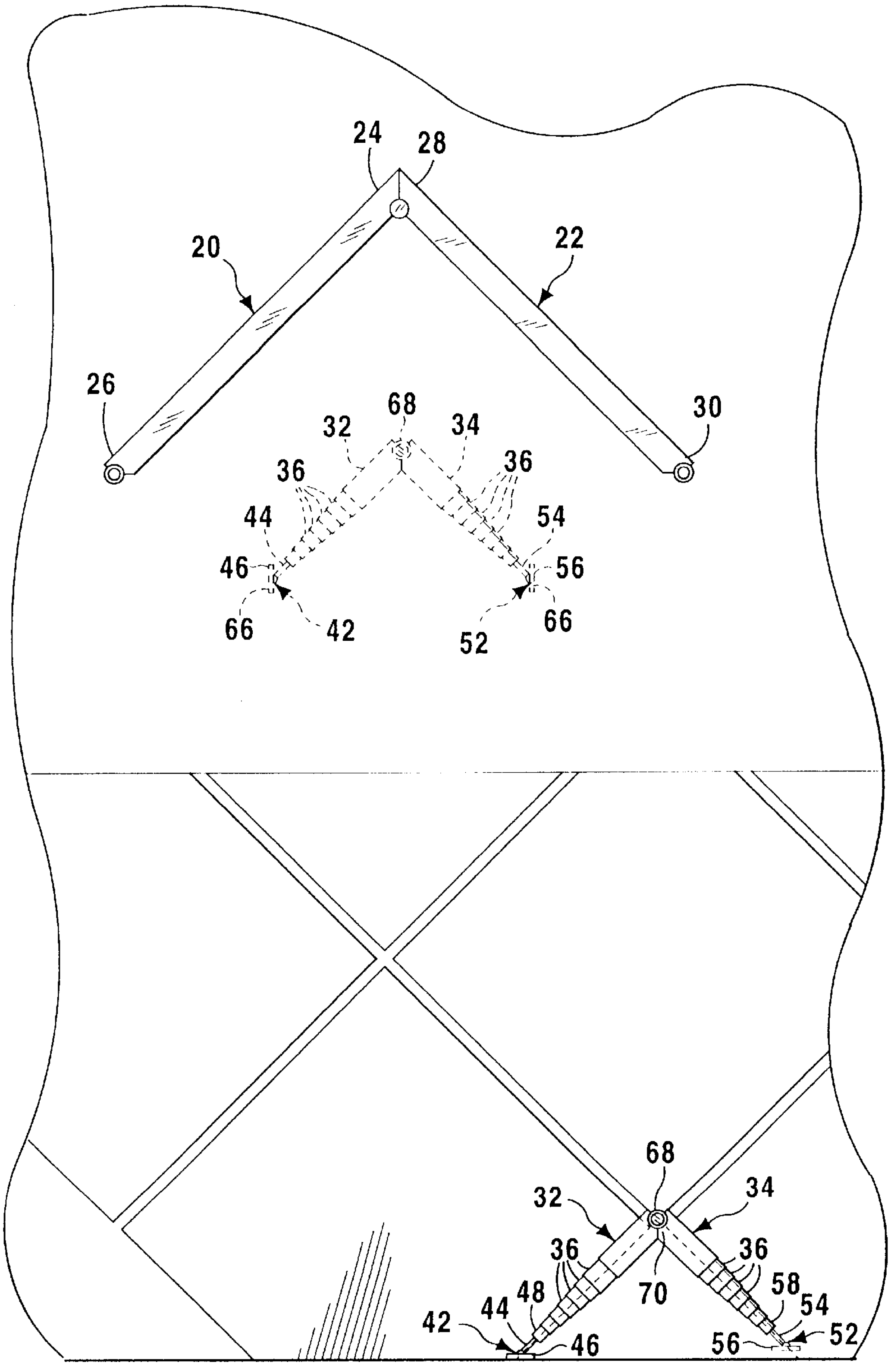
FIG. 4 is a top plan view of the marking indicator template jig of the present invention wherein the telescoping legs have been removed from the stationary legs and connected together for marking a tile for placement in an area less than half the size of the tile.
Figure 5:
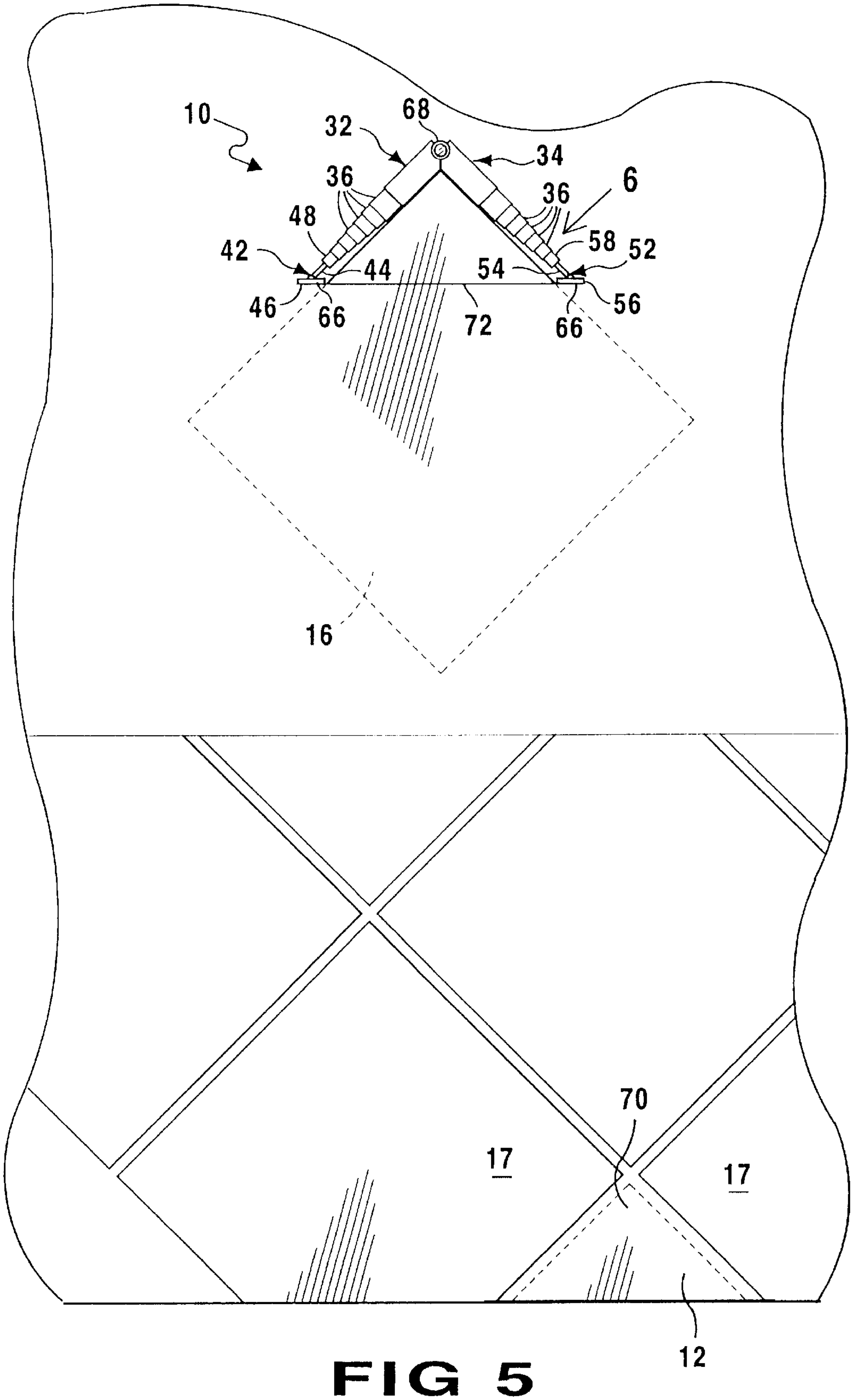
FIG. 5 is a top plan view of the marking indicator template jig of the present invention wherein the telescoping legs have been adjusted for marking and cutting a tile for placement in an area less than half the full size of the tile.

FIG. 4 illustrates the marking indicator template jig 10 with the first and second telescoping legs 32 and 34, respectively, detached from the first and second legs 20 and 22, respectively. The first and second telescoping legs 32 and 34, respectively, are pivotally connected together at a point 68 and are illustrated in dashed lines. The use of the first and second telescoping legs 32 and 34, respectively, separated from the first and second legs 20 and 22, respectively, is useful when the open area 12 is smaller in size than one half the size of one tile 16. Such is shown in the lower half of FIG. 4 and in FIG. 5. FIG. 5 illustrates the first and second telescoping legs 32 and 34, respectively, positioned over a tile 16 for marking the tile. The tile 16 will be cut at the point marked for placement in the open area 12.

Figure 6:
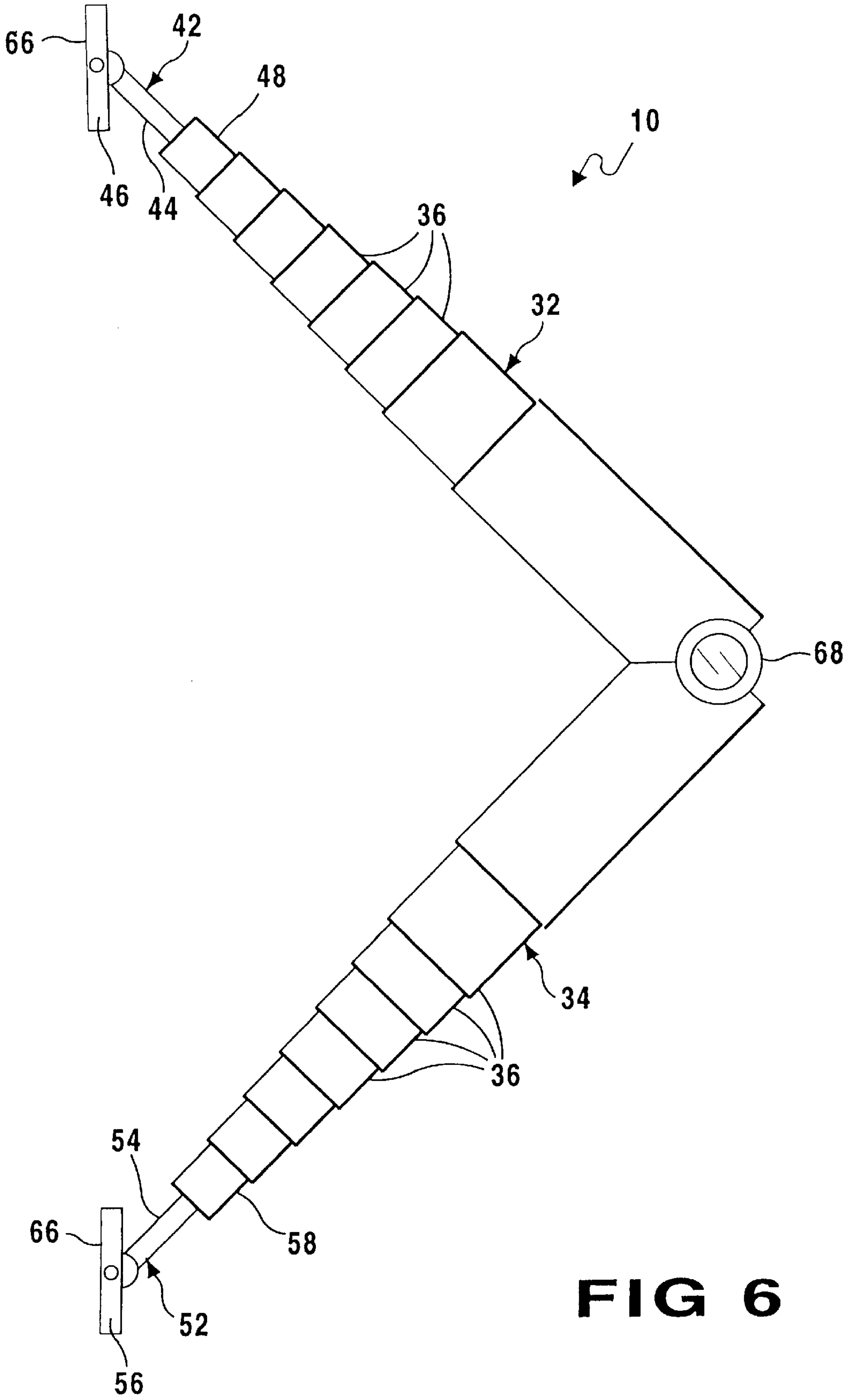
FIG. 6 is an enlarged perspective view of the telescoping legs of the marking indicator template jig of the present invention.

When measuring the size of an open area 12 having dimensions less than half the size of a full tile 16, the first and second telescoping legs 32 and 34, respectively, are detached from their connection to the first and second legs 20 and 22, respectively, and connected together. The first and second telescoping legs 32 and 34, respectively, are then pivoted to extend perpendicular to each other and positioned at a head 70 of the open area 12. The first and second telescoping legs 32 and 34, respectively, are then extended so that the feet 42 and 52, respectively, thereon are flush against the obstruction 18. The marking indicator template jig 10 is then used to mark the tile 16 for cutting by drawing a line 72 thereon as described above with respect to FIGS. 1–3. An enlarged view of the connection between the first and second telescoping legs 32 and 34, respectively, is illustrated in FIG. 6.

Figure 7:
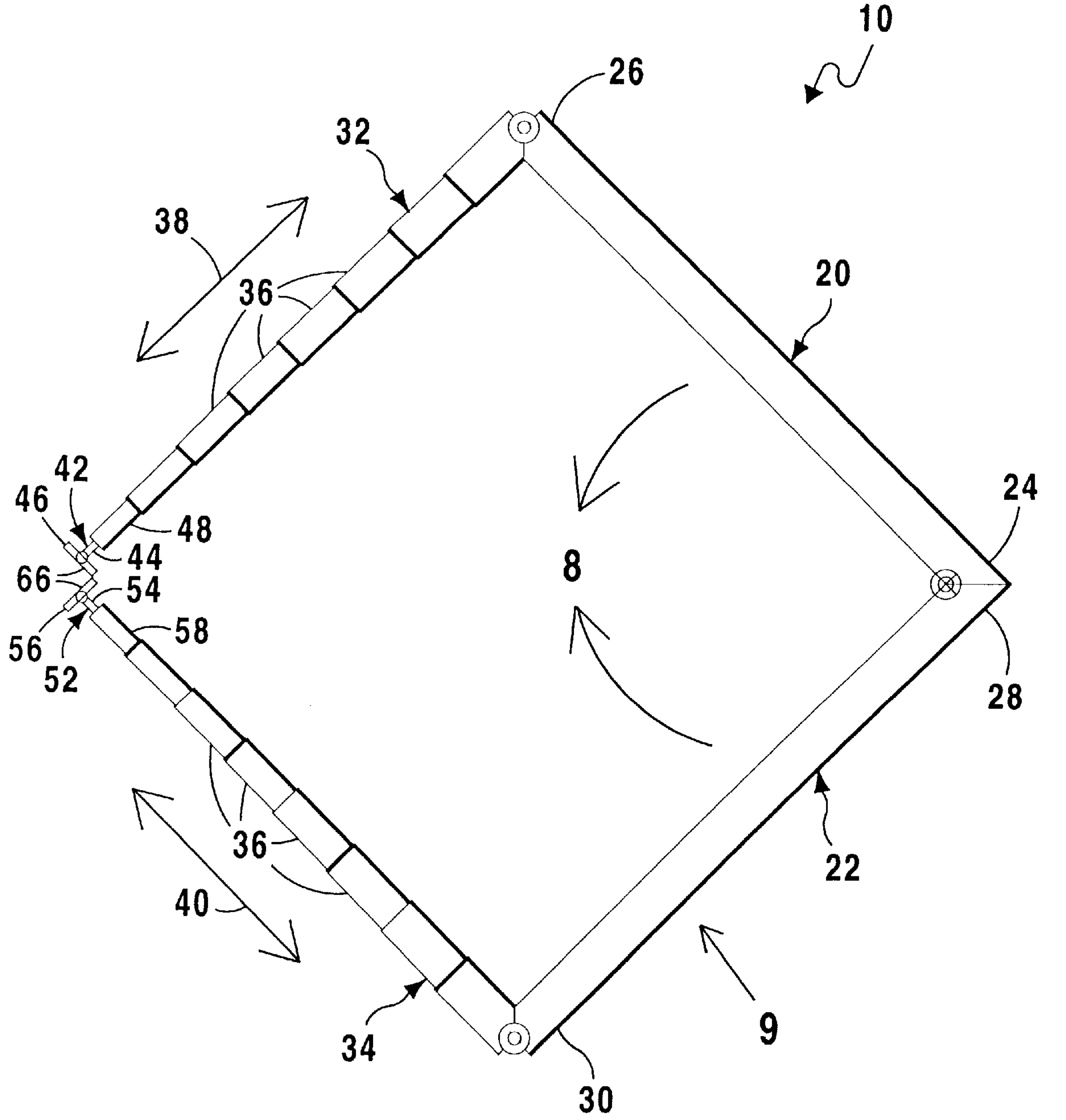
FIG. 7 is an enlarged perspective view of the making indicator template jig of the present invention in a fully extended position.
Figure 10:
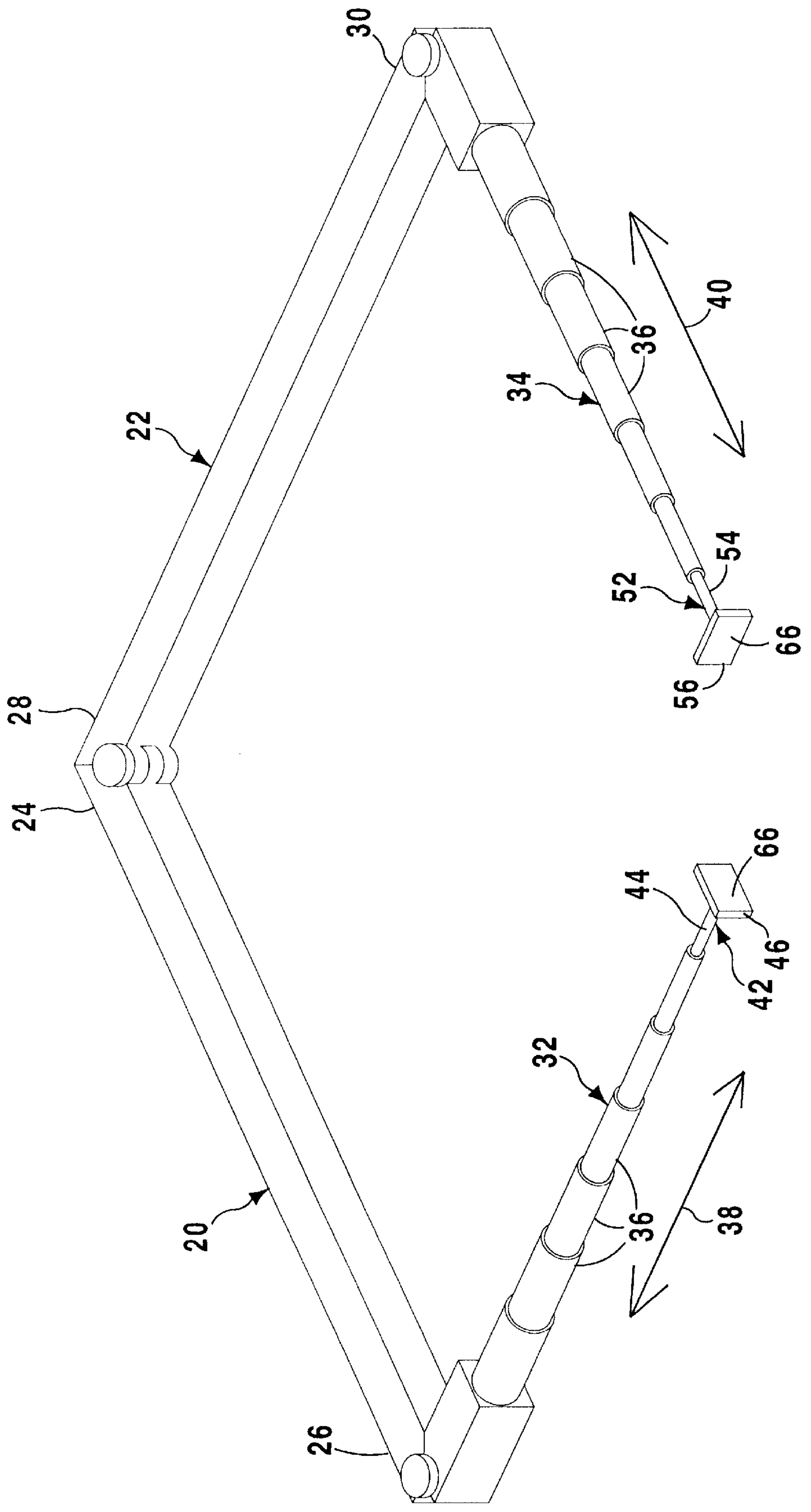
FIG. 10 is a perspective view of the marking indicator template jig of the present invention.

The marking indicator template jig 10 is illustrated in its fully extended position in FIG. 7. A perspective view of the marking indicator template jig 10 is illustrated in FIG. 10. In this position the first leg 20, second leg 22, first telescoping leg 32 and second telescoping leg 34 are combined to form a square, each leg forming one side thereof. The square shape formed by the marking indicator template jig 10 is identical to that of the tiles forming the diagonal pattern. By changing the length of the telescoping legs 32 and 34, respectively, the shape of an undersized area having a straight cut therethrough can be formed by the marking indicator template jig 10 for marking the tile to be cut.

Figure 8:
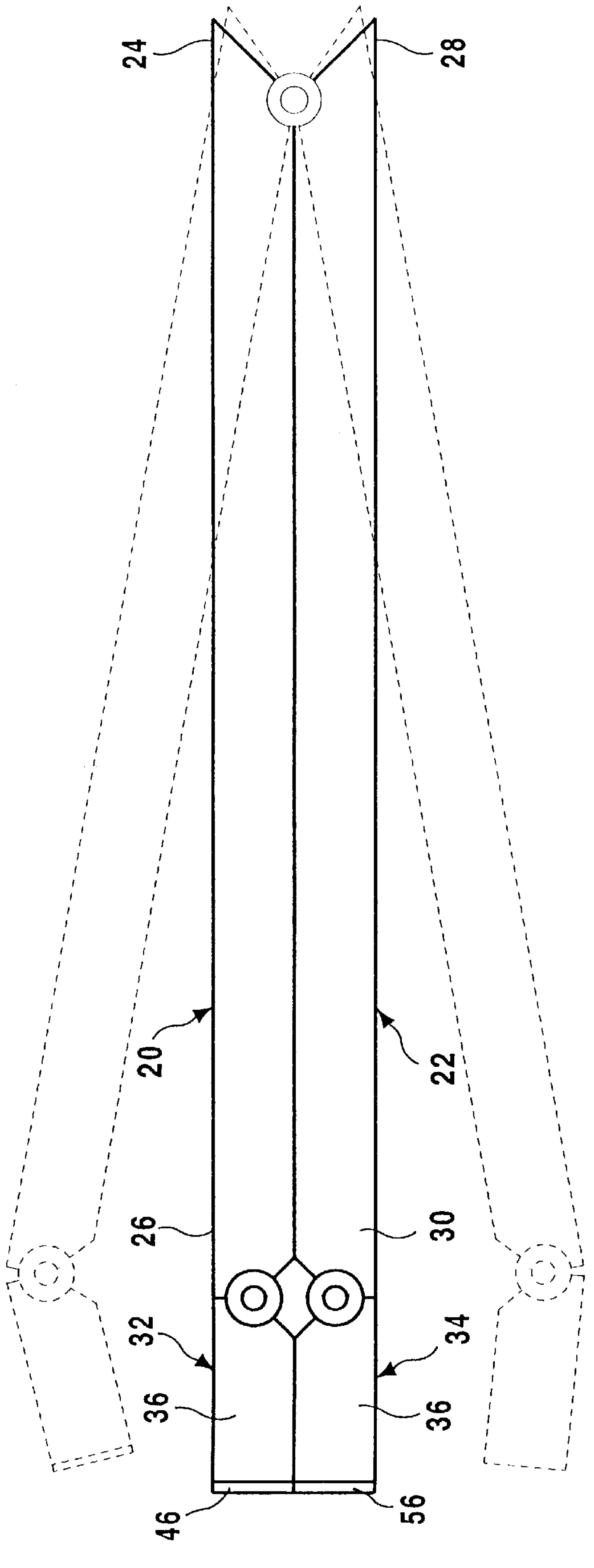
FIG. 8 is an enlarged side perspective view of the marking indicator template jig of the present invention in a fully closed position, a partially open position being shown in dashed lines.

The marking indicator template jig 10 is illustrated in FIG. 8 in an unextended position formed by pivoting the legs 20 and 22 in the direction of the arrows labeled 8 in FIG. 7. A partially expanded state for the marking indicator template jig 10 is shown in dashed lines. In this view the telescoping legs 32 and 34, respectively, are illustrated in the completely retracted position to have a minimum length.

Figure 9:
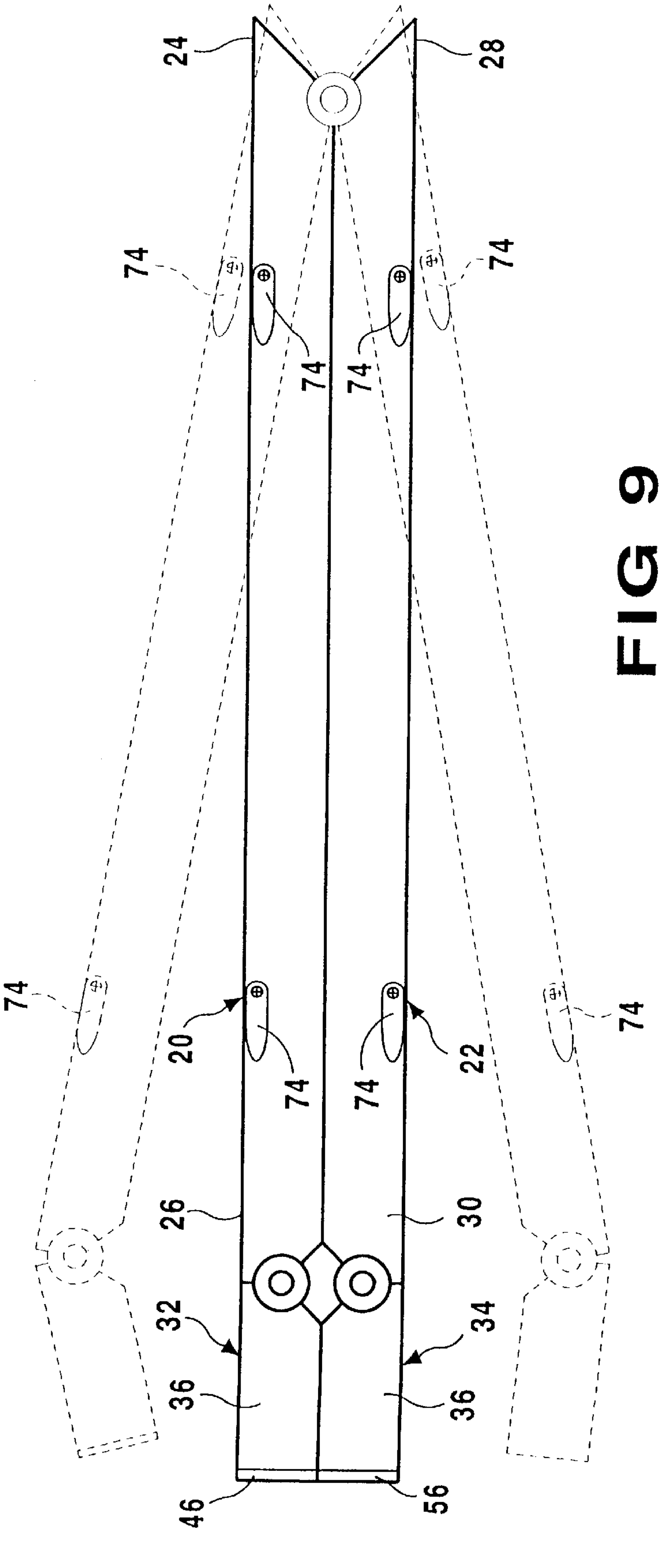
FIG. 9 is a bottom plan view of the marking indicator template jig of the present invention in a fully closed position including grout gap adjustment cams taken in the direction of the arrow 9 of FIG. 7, a partially open position being shown in dashed lines.

FIG. 9 illustrates the marking indicator template jig 10 in the fully closed position taken in the direction of the arrow labeled 9 in FIG. 7. A partially expanded state for the marking indicator template jig 10 is shown in dashed lines. This figure also includes grout gap adjustment cams 74 positioned on a side of the first and second legs 20 and 22, respectively, for maintaining the grout gap between tiles in the pattern while measuring the dimensions of the open area 12 for use in marking and cutting the tiles 16.

Figure 11:
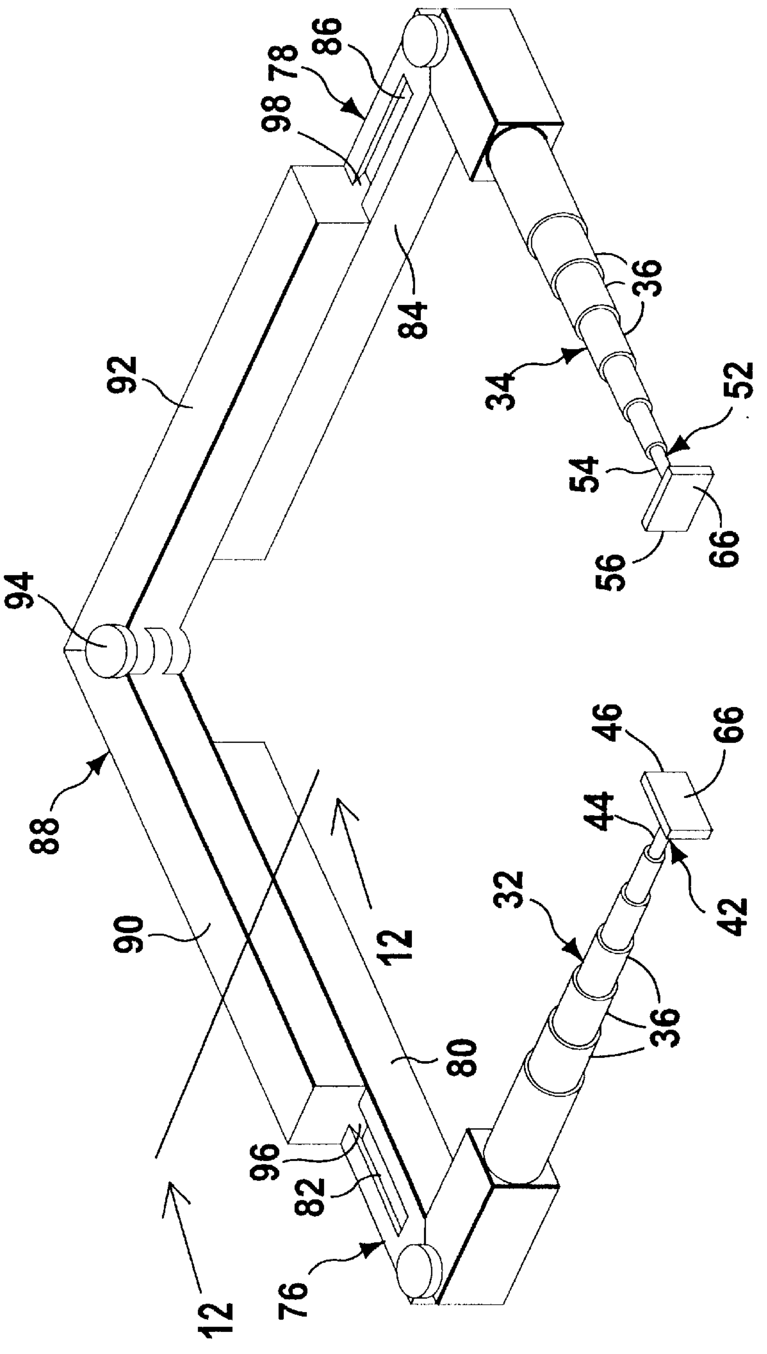
FIG. 11 is a perspective view of the marking indicator template jig of the present invention including adjustable stationary legs.

FIG. 11 illustrates the marking indicator template jig 10 including first and second adjustable legs 76 and 78, respectively. These legs 76 and 78 are adjustable in their length. The first adjustable leg 76 includes a base side 80 including a dovetail recess 82 extending therealong. The second adjustable leg 78 includes a base side 84 having a dovetail recess 86 extending therealong. A connection device 88 includes first and second arms 90 and 92, respectively connected by a pivotal connection 94. The first arm 90 includes a dovetail shaped protrusion 96 which is received by the dovetail shaped recess 82 in the first adjustable leg 76. The second arm 92 includes a dovetail shaped protrusion 98 which is received by the dovetail shaped recess 86 in the second adjustable leg 78. The first and second adjustable legs 76 and 78 are slideable along the length of the dovetail protrusions 96 and 98, respectively, for adjusting their length. This allows the marking indicator template jig 10 to be adapted for use with a wide range of tile sizes.

The operation of the marking indicator template jig 10 will now be described with reference to the figures. In operation, the marking indicator template jig 10 is originally in its unexpanded position. When a user is placing a tile pattern on a floor and an obstruction in the floor is encountered, the tile to be place in the open area partially defined by the obstruction must be cut to meet the size of the open area. The marking indicator template jig 10 is useful when the tile pattern is a rectangular pattern.

Figure 12:
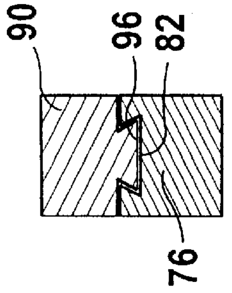
FIG. 12 is a cross-sectional view of the marking indicator template jig of the present invention taken along the line 12—12 of FIG. 11.

At this time, the marking indicator template jig 10 is expanded by pivoting the first and second legs 20 and 22 until they extend perpendicular to each other. The first and second telescoping legs 32 and 34 are in their compressed state at this time and are pivoted to extend perpendicular to the respective leg to which they are attached and facing each other. The marking indicator template jig IO is then positioned in the open area to be measured for placement of a tile. If the marking indicator template jig 10 illustrated in FIGS. 11 and 12 is being used, the first and second adjustable legs 76 and 78 are slid along the length of their respective dovetail protrusion 96 and 98 until they are of a length substantially equal to that of the adjacent tiles 17 defining two sides of the open area 12. The first and second telescopic legs 32 and 34 are then extended until the feet 42 and 52 thereon are positioned flush against the obstruction 18. At this time the marking indicator template jig 10 is of a shape substantially equal to that of the open area.

The marking indicator template jig 10 is now removed from the open area 12 and positioned atop the tile to be marked and cut. A line extending between the base 66 of the flat portions of the first and second feet is drawn on the tile. The tile is then cut along the line drawn and is now has substantially equal dimensions to that of the open area 12. The tile is then secured in the open area 12. This process is repeated with each subsequent tile to be positioned in an undersized area until the entire floor is tiled.

The marking indicator template jig of the present invention is formed from at least one of steel, iron, any metal, any metal alloy and any combination thereof. Alternatively, the marking indicator template jig may be formed from at least one of plastic Lucite, any polymeric material and any combination thereof.

From the above description it can be seen that the marking indicator template jig of the present invention is able to overcome the shortcomings of prior art devices by providing a tile cutting marking indicator template jig which is able to indicate a line or plurality of lines for cutting a tile to be laid in a pattern by finding the line or lines of any obstacles preventing laying the full tile in the desired pattern thereby allowing a tile to fit in an undersized area. The marking indicator template jig including a pair of telescoping legs able to extend and retract to match the size of any tile, the pair of telescoping legs being detachable from a pair of stationary legs for marking a tile for placement in an area less than half the size of the tile. Furthermore, the marking indicator template jig of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A marking indicator template jig for marking a title to be cut and positioned in an open area of a a) first and second legs, each of said first and second legs including first and second opposing ends, each of said first and second legs including a recess extending along a length of a first side thereof, said first and second legs having a connection device with said first end of said first leg being pivotally connected to said first end of said second leg by said connection device;

b) said connection device including a first arm and a second arm, wherein said second arm connects and extends perpendicular to said first arm, said first arm including a protrusion slidably connected within said recess in said first leg and said second arm including a protrusion slidably connected within said recess in said second leg for adjusting the lengths of said first and second legs;

c) a first telescoping leg pivotally connected to said second end of first leg, said first telescoping leg having an adjustable length;

d) a second telescoping leg pivotally connected to said second end of said second leg, said second telescoping leg having an adjustable length and wherein said marking indicator template jig is movable between a first unextented position and a second extended position in which said first and second legs are positioned within an open area of an area smaller than the tile and against adjusted tiles defining a first portion of the open and the length of said first and second telescoping legs are adjusted to meet an objection defining a second portion of the open are such that said marking indicator template jig is of a dimension substantially equal to that of the open area for use in marking the tile for cutting.

2. The tile cutting marking indicator template jig as recited in claim 1, wherein said recess in both said first and second legs is of a dovetail shape and said protrusion extending from both said first and second arms is of a dovetail shape.

* * * * *